May 8, 1923.
G. A. DOTY
1,454,109
NONSLIP GUARD FOR AUTOMOBILE TIRES
Filed May 21, 1920 2 Sheets-Sheet 1
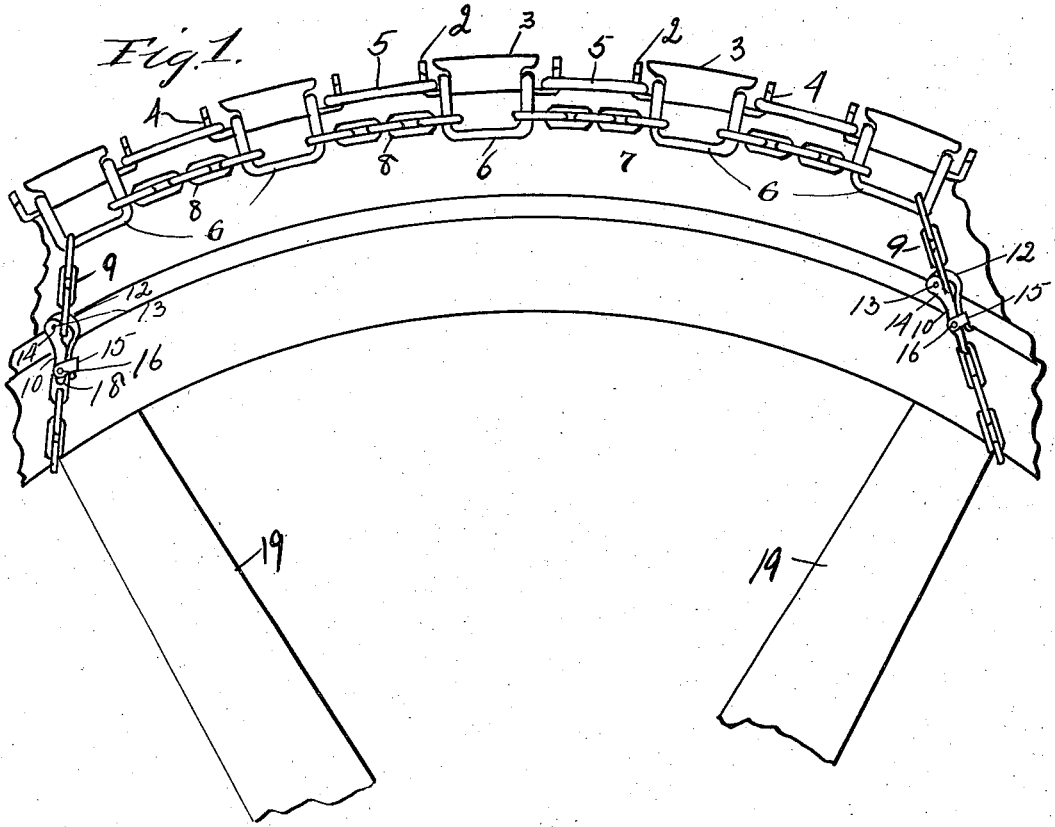
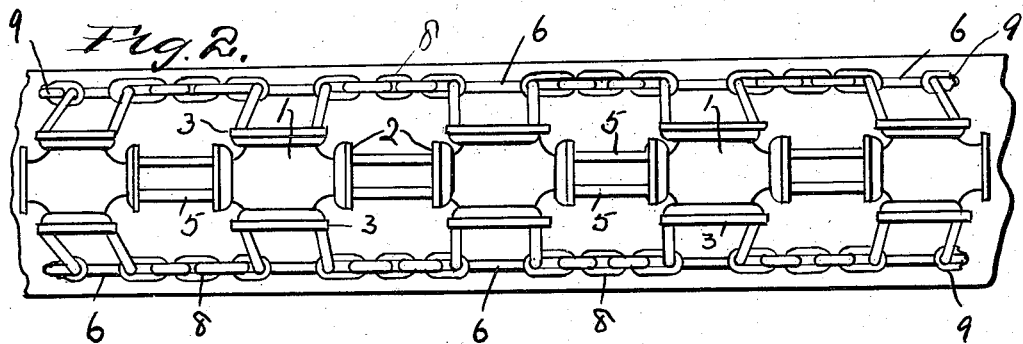

May 8, 1923.                                               1,454,109
G. A. DOTY
NONSLIP GUARD FOR AUTOMOBILE TIRES
Filed May 21, 1920          2 Sheets-Sheet 2
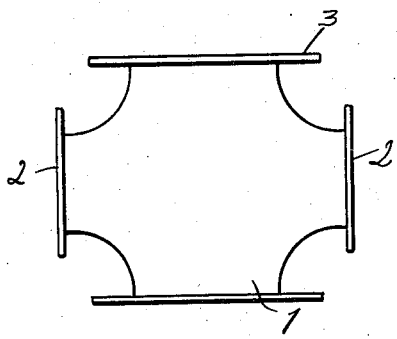
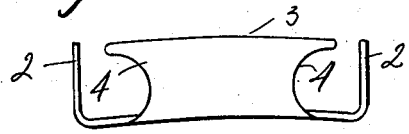
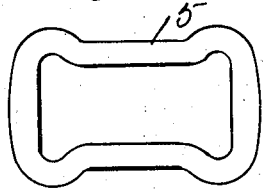
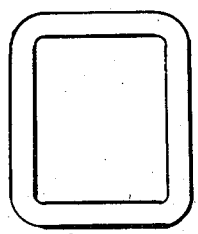
Inventor
Giles A. Doty
By W. W. Williamson
Atty.

Patented May 8, 1923.

1,454,109

UNITED STATES PATENT OFFICE.

GILES A. DOTY, OF DAVENPORT, IOWA.

NONSLIP GUARD FOR AUTOMOBILE TIRES.

Application filed May 21, 1920. Serial No. 383,065.

*To all whom it may concern:*

Be it known that I, GILES A. DOTY, a citizen of the United States, residing at Davenport, in the county of Scott and State of Iowa, have invented new and useful Improvements in Nonslip Guards for Automobile Tires, of which the following is a specification.

My invention relates to a new and useful improvement in nonslip guards for automobile tires, and has for its object to provide an exceedingly, simple and effective device of this description which may be readily applied to an automobile wheel tire either in sections or extended entirely around the tire.

A further object of my invention is to so construct the guard of plates and links, the plates having their edges upturned certain of which acting as means for attaching the links all of said upturned ends serving to take a hold upon the road bed to prevent skidding; and A further object of my invention is to provide simple and effective means for attaching the guard to the tire and securing it in position by embracing the felly and spokes of the wheel.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Fig. 1, is a side view of a portion of an automobile wheel showing a section of my improved guard applied thereto.

Fig. 2, is a plan view of Fig. 1.

Fig. 3, is an enlarged plan view of one of the nonskid plates.

Fig. 4, is an edge view of Fig. 3.

Fig. 5, is an edge view of Fig. 3 taken at right angles to Fig. 4.

Fig. 6, is a plan view of one of the links for coupling the plates together.

Fig. 7, is an edge view of Fig. 6.

Fig. 8, is a plan view of the side links.

Fig. 9, is an edge view of Fig. 8.

Fig. 10, is a side view of the attaching snap hook for securing the guard upon the wheel.

Fig. 11, is an edge view of Fig. 10.

In carrying out my invention as here embodied, I provide a number of plates 1 in the general form of a cross having the edges 2 and 3 thereof upturned for contact with the road bed, and these upturned edges are undercut as indicated at 4 so as to provide for the attachment of links thereto, the edges 2 receiving the links 5 by which the plates are attached together making a chain, while the edges 3 receive the links 6 which lie crosswise of the tire 7 to which the short chains 8 are secured for connecting these links 6 together certain of the latter are also utilized for the securement of the attaching chains 9 which are intended to pass around the felly of the wheel, their ends being detachably secured together by the snap hooks 10.

The snap hooks 10 consist of a body having a central groove 11 therein, here shown as being produced by forming the body of sheet metal and a hook 12 is pivoted at 13 between the ears 14 formed on the body so that the upper end thereof may swing into the groove.

15 represents a latch which is pivoted at 16 to the body so that when the hook is swung into closed position this latch may be turned down over the upper end of the hook which is curved as indicated at 17 for that purpose thereby securely holding the hook against accidental displacement, the upper end of the body also has pivoted therein the attaching eye 18 to which one end of the short chain is secured. By this arrangement the short chains 9 may be passed around the felly of the wheel their ends being secured together by the snap hooks thus securely holding the guard upon the tire. When it is intended to use the guard in sections as shown in Fig. 1, each of these sections is secured to the wheel in such manner that the short chains 9 will stand at angles to each other and bear against the spokes 19 of the wheel thus holding the guard against slipping in either direction thereby enabling it to act as a grip upon the road bed when the wheel is being turned either forward or backward; but when it is desirable to extend the guard around the entire tire the short chains may be set at any desired angle since a slight travel of the guard upon the tire will not be objectionable.

By the use of my improvement should any section of the guard break or become unduly worn it may be readily replaced by uncoupling the links, removing one or more of the plates and substituting new ones therefor, thereby lessening the cost of maintaining an effective non skid device upon an automobile wheel.

Of course I do not wish to be limited to the exact details of construction as herein shown as these may be varied within the limits of the appended claims without departing from the spirit of my invention.

Having thus fully described my invention, what I claim as new and useful is:—

1. A non-slip guard including a series of plates, each plate having four radiating arms, road engaging elements formed integral with said arms and projecting from their outer ends at right angles thereto, all of said road engaging elements having oppositely disposed undercut recesses in their side edges and links connected to the road engaging elements and resting in said recesses.

2. A nonskid guard for automobile wheels including a plate in the shape of a cross, portions of the arms of said plate being upturned to produce road engaging projections and having the side edges thereof undercut for the purpose stated.

In testimony whereof, I have hereunto affixed my signature.

GILES A. DOTY.